United States Patent [19]

Ledvina

[11] Patent Number: 4,758,210

[45] Date of Patent: Jul. 19, 1988

[54] SILENT CHAIN AND SPROCKET SYSTEM

[75] Inventor: Timothy J. Ledvina, Ithaca, N.Y.

[73] Assignee: Borg-Warner Automotive, Inc., Troy, Mich.

[21] Appl. No.: 32,813

[22] Filed: Apr. 1, 1987

[51] Int. Cl.$^4$ ............................................. F16G 13/04
[52] U.S. Cl. ..................................... 474/212; 474/213
[58] Field of Search ............................... 474/212–217; 59/84, 89

[56] References Cited

U.S. PATENT DOCUMENTS

| Re. 12,912 | 1/1909 | Morse ............................ 474/215 X |
|---|---|---|
| 586,991 | 7/1897 | Curley ............................ 474/212 X |
| 588,950 | 8/1897 | Brown ............................ 474/232 X |
| 1,115,960 | 11/1914 | Morse ............................ 474/215 |
| 1,270,460 | 6/1918 | Taylor ............................ 474/212 X |
| 1,447,644 | 3/1923 | Chapman ............................ 474/212 |
| 1,634,641 | 7/1927 | Bens ............................ 474/215 X |
| 2,498,788 | 2/1950 | Bremer ............................ 474/206 X |
| 2,653,485 | 9/1953 | MacArthur ............................ 474/215 |
| 4,342,560 | 8/1982 | Ledvina et al. ............................ 474/213 X |
| 4,509,937 | 4/1985 | Ledvina et al. ............................ 474/213 X |

Primary Examiner—Stephen J. Novosad
Assistant Examiner—Thuy M. Bui
Attorney, Agent, or Firm—James A. Geppert

[57] ABSTRACT

A silent chain for automotive vehicle or industrial drive applications wherein the chain is formed of blocks of links alternating with pairs of guide links joined by pivot pins wherein both teeth of each link are in driving engagement with the teeth of the driving sprocket with alternating inside flank and outside flank engagement. The pins joining the guide links and blocks of links lie on the approximate pitch diameter of the sprocket.

13 Claims, 2 Drawing Sheets

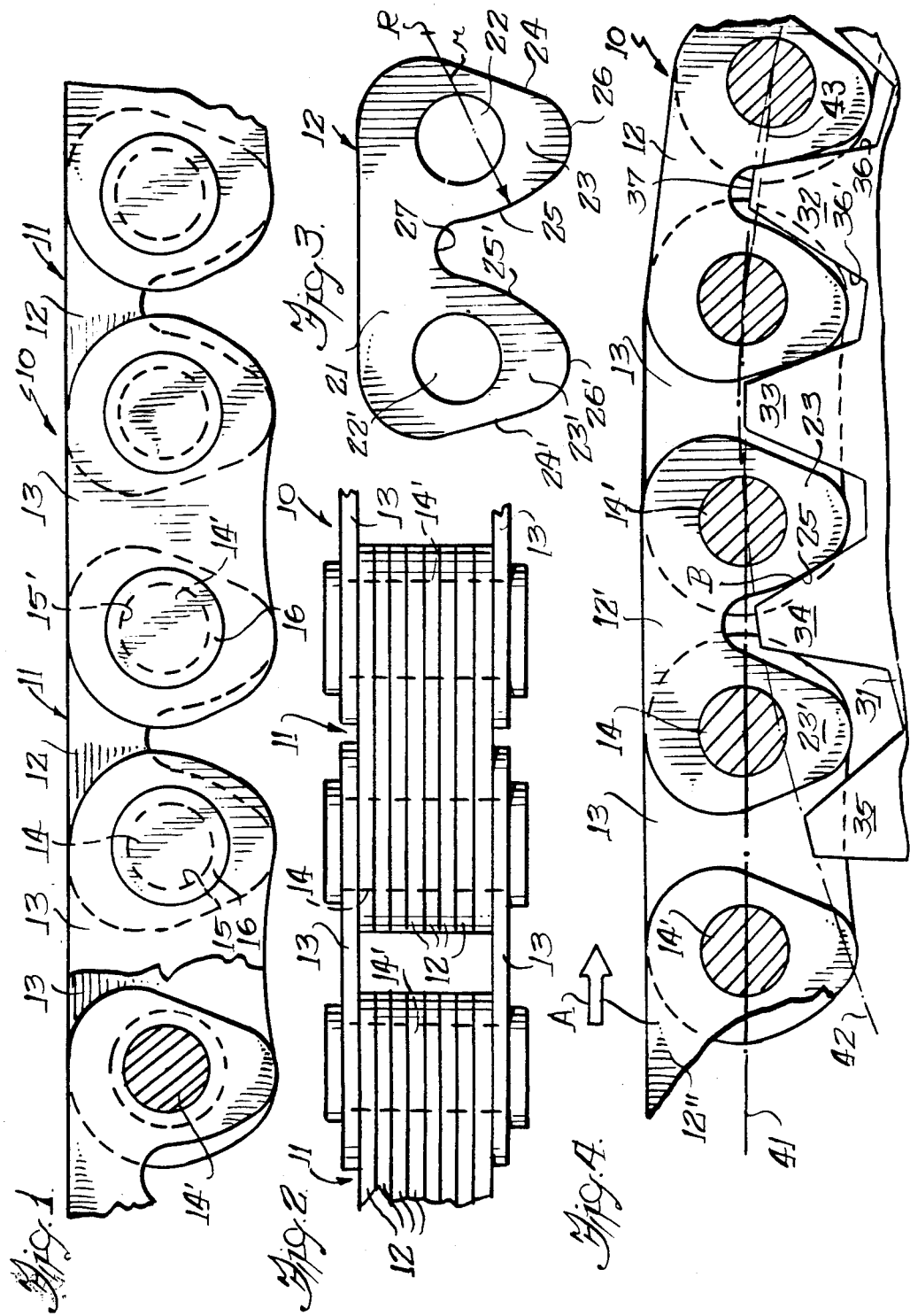

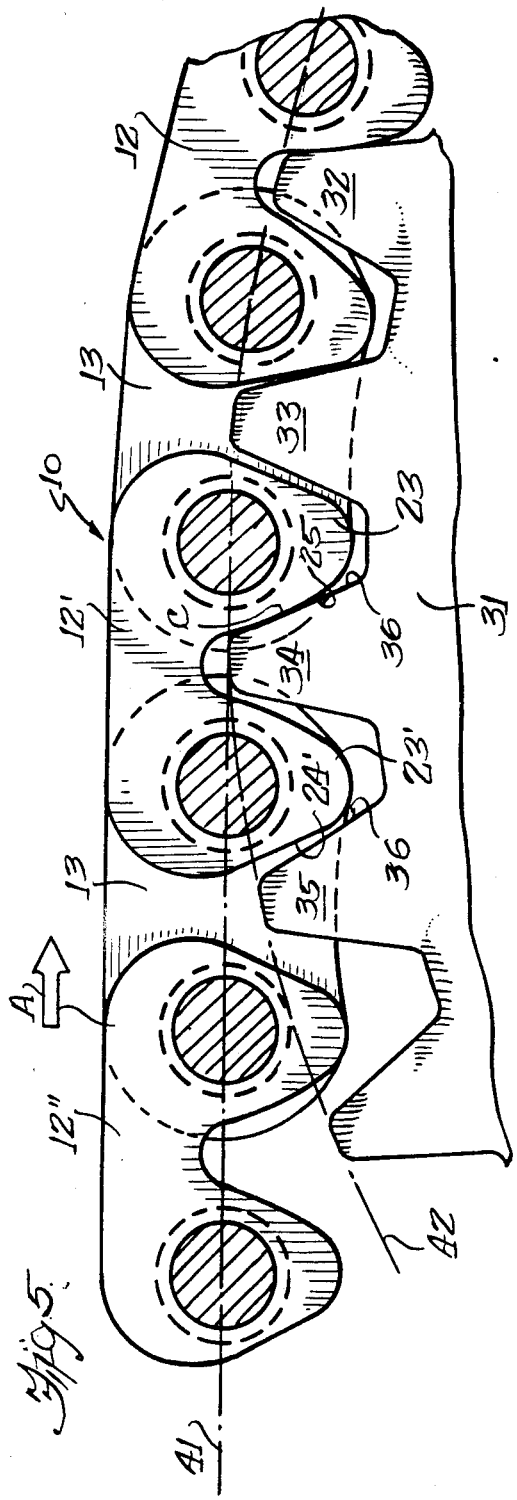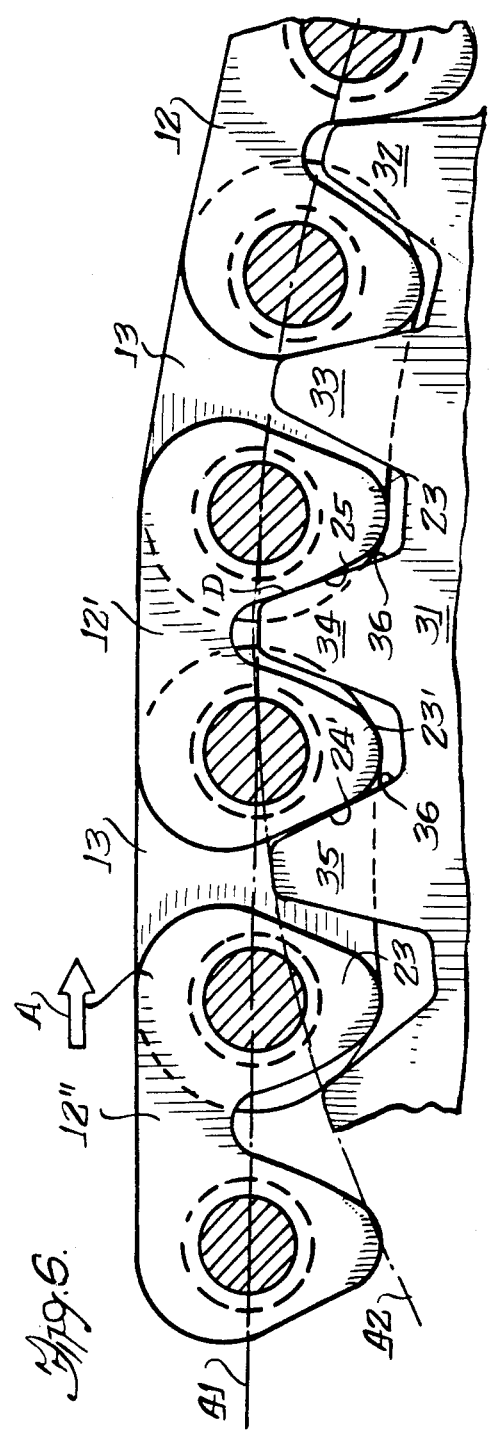

SILENT CHAIN AND SPROCKET SYSTEM

BACKGROUND OF THE INVENTION

The present invention relates to an improved silent timing chain for automotive or industrial drive applications.

Conventional silent timing chains have been used for many years to transmit power and motion between shafts in automotive applications. The majority of these chains were formed of rows or ranks of toothed links interleaved with adjacent rows of toothed links and having aligned apertures receiving pivot pins to join the rows and provide articulation of the chain as it passes around the driving and driven sprockets. Guide links were utilized on the outside edges of alternate rows of links in the chain to position the chain laterally on the sprockets. The teeth of each row of links engaged the sprocket teeth on either their inner flank or their outer flank, and each joint was supported by the links in one row. Each tooth on the driving sprocket transferred load to the chain, which offered a smooth engagement with the sprocket and quiet operation.

Silent chains were also produced using block constructions in the early 1900's. However, their usefulness was limited due to their low strength and were replaced by the silent chains previously described. The engagement characteristics of these early block chains are unknown, but it is likely that such chains were constructed by omitting the inside links in the guide row without compensating for the lack of interleaved links present in conventional silent chains. Other types of timing drive chains involve the use of roller chains, especially in industrial applications.

SUMMARY OF THE INVENTION

The present invention relates to an improved silent timing chain and sprocket system designed to transmit torque and power between shafts as well as serve as a mechanical motion transfer mechanism. The chain is constructed in a block configuration comprising groups or rows of closely stacked inside links designed to drivingly contact the sprockets alternating with and flanked by pairs of outside guide links or a center guide link in the adjacent rows. The interleaved inside links normally found in the rows having guide links have been omitted, resulting in a chain design constructed of fewer components which is lighter in weight and lower in manufacturing cost.

The present invention also comprehends the provision of a novel silent timing drive chain wherein the inside links are so constructed and arranged that the leading inside flank of a link drivingly contacts a tooth on the driving sprocket while the trailing outside flank of the same inside link contacts the next adjacent sprocket tooth. Thus, all of the teeth on the sprocket act to transfer load to the chain and each joint of the chain is supported as it engages the driving sprocket. This results in quiet operation similar to conventional silent chain formed of interleaved rows of links.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a side elevational view of a portion of the silent timing drive chain of the present invention.

FIG. 2 is a top plan view of the chain of FIG. 1.

FIG. 3 is a side elevational view of a link of the chain.

FIGS. 4, 5, and 6 are side elevational views in sequence of the chain links engaging the sprocket teeth with the front guide links being omitted.

DESCRIPTION OF THE PREFERRED EMBODIMENT

Referring more particularly to the disclosure in the drawings wherein is shown an illustrative preferred embodiment of the present invention, FIGS. 1 and 2 disclose a silent timing drive chain 10 of constant pitch utilized to drive the cam shaft in an automotive vehicle engine, wherein the chain consists of blocks 11 of inside closely stacked links 12 (FIG. 3) alternating with pairs of flanking outside guide links 13 of conventional design joined by round pivot pins 14 or other suitable pivot means. Each guide link 13, as seen in FIG. 1, does not have a toothed configuration as it is utilized to prevent lateral motion of the chain relative to the sprocket (see FIGS. 4, 5 and 6), but is provided with spaced apertures 15,15' receiving the pivot pins 14,14'; which pins either have a press fit within the apertures 15 or 15' or project through the apertures to be headed at 16 at each end retaining the link together.

Each inside link 12, as seen in FIG. 3, consists of an inverted toothed link including a link body 21 having a pair of spaced apertures 22,22' to receive the pivot pins 14 or 14' and a pair of teeth 23,23' depending from the link body; each tooth having a generally straight outside flank 24 or 24' and a curved inside flank 25 or 25' meeting at a rounded tip 26 or 26'. The inside flank 25 of tooth 23 is struck from a radius r having its center located outside of the confines of the link at R, and the inside flank 25' similarly is struck from a second radius (not shown). The inside flanks 25,25' meet in a rounded crotch 27 above a line through the centers of the apertures 22,22'. Although shown as substantially straight, the outside flanks 24,24' could also be curved generated by a radius having its center outside the link confines.

Now considering FIGS. 4 through 6, a driving sprocket 31 has a plurality of identical teeth 32, 33, 34, 35, etc. equally spaced about the circumference of the sprocket; each sprocket tooth having generally straight-sided edges or flanks 36,36' joined by an outer end surface 37. In FIG. 4, the chain 10 moves to the right in the direction of arrow A into engagement with the sprocket 31 on the horizontal line 41 or chain pitch line. There will be two pins 14,14' flanking a sprocket tooth 33 at "top dead center"; at which point the pitch line 41 of the chain will be tangent to the chordal pitch diameter of the sprocket; i.e. the circle smaller than circle 42 that is tangent to the chords 43 formed when the chain wraps the sprocket. As the sprocket rotates clockwise, the pin 14 of the right hand side of the sprocket tooth 33 will follow the arc 42 of the sprocket pitch diameter; i.e. the circle passing through the center of the chain pins 14,14' as the chain is wrapped on the sprocket 31. Thus, the pin 14 will rise vertically reaching a maximum value when this pin is "top dead center" and is flanked by two teeth. As the sprocket continues to rotate clockwise, this pin will follow the arc 42 of the sprocket pitch diameter until another tooth is at "top dead center". The pin will now be at the left hand position of the sprocket tooth and the horizontal pitch line 41 passing through the centers of the pins in the free strand will again be tangent to the chordal pitch diameter.

Considering the engagement of the links 12 with the sprocket 31, a first link 12 is in substantially full engagement with adjacent sprocket teeth 32 and 33 as the sprocket rotates in the direction of arrow A. The next successive tooth 34 has its flank or edge 36 initially engaging the inside flank 25 of link tooth 23 for a second chain link 12' while the other link tooth 23' is spaced from the sprocket tooth 35. The link engagement with sprocket tooth 34 is at a lower portion B of the inside flank.

As rotation of the sprocket continues (see FIG. 5), the flank 36 of sprocket tooth 34 has moved up on the inside flank 25 from contact area B to contact area C, and the flank of the next successive tooth 35 is approaching contact with the outside flank 24' of trailing link tooth 23'.

Further rotation of the sprocket 31 in the direction of arrow A causes the flank 36 of tooth 34 to slide farther up on the inside flank 25 of tooth 23 to contact area D, where the sprocket tooth and link tooth are in full engagement (FIG. 6). Also, the flank 36 of sprocket tooth 35 engages the outside flank 24' of trailing tooth 23', and the leading tooth of the next link 12" is approaching engagement of the next succeeding sprocket tooth. As the chain is wrapped around the sprocket, the teeth remain in full engagement until the links begin to leave the sprocket and travel towards the driven sprocket (not shown). The driven sprocket is driven by the chain as it leaves the sprocket and enters the tight strand to the driving sprocket in the direction of arrow A. On the other side of the driven sprocket, the sprocket acts as a driver in relation to the slack strand of the chain.

Also as seen in FIGS. 4, 5 and 6, contact is maintained on the sprocket when the chain is under tension. Each sprocket tooth carries load for strength of the sprocket. The construction of the chain is more economical and results in a quiet operation of the chain. Noise tests have shown that the present improved chain is less noisy than an equivalent roller chain.

I claim:

1. A silent timing chain with a driving sprocket having circumferentially equally spaced teeth thereon, comprising rows of identical inverted tooth links sticked adjacent to each other forming blocks alternating with and separated by pairs of directly adjacent flanking guide links, each inverted tooth link having a leading tooth and a trailing tooth relative to the sprocket, both the guide links and inverted tooth links having pairs of spaced apertures, a pair of the guide links having apertures aligned with the apertures of the next adjacent block of inverted tooth links, and a pivot pin received in each row of aligned apertures providing a joint for articulation of the chain, such that all of the teeth on the driving sprocket help transfer load to the chain.

2. A silent timing chain as set forth in claim 1, wherein both the leading and trailing teeth on the links of each block engage successive teeth on the sprocket.

3. A silent timing chain as set forth in claim 1, wherein each tooth of each link includes an inside flank and an outside flank and, as the chain engages said sprocket, the inside flanks of the leading teeth of a link block engage one sprocket tooth and the outside flanks of the trailing teeth of the link block engage the next adjacent sprocket tooth.

4. A silent timing chain as set forth in claim 3, in which both the inside flanks and the outside flanks of the chain link blocks transmit power between the chain wraps the sprocket.

5. A silent timing chain as set forth in claim 3, in which the sprocket tooth initially engages a lower portion of the inside flanks of leading link teeth and slides up the flank as the chain more fully engages the sprocket.

6. A silent timing chain as set forth in claim 3, wherein a pitch line for the chain runs through the centers of said apertures, and the inside flanks are joined in a rounded crotch positioned above the pitch line for the link.

7. A silent timing chain as set forth in claim 3, wherein the inside flanks of the link teeth have curved edges defined by radii having centers of curvature located outside the confines of the link.

8. A silent timing chain as set forth in claim 3, wherein said chain has a pitch line extending through the centers of the link apertures, and said sprocket has a circular pitch line tangential to the tips of the sprocket teeth, said chain pitch line substantially coinciding with the sprocket pitch line as the chain wraps the sprocket.

9. A silent timing chain and sprocket combination having a plurality of blocks comprising rows of identical inverted tooth links stacked adjacent to each other alternating with and separated by pairs of directly adjacent parallel flanking guide links, said links and guide links having spaced apertures, and a sprocket having a plurality of substantially equally spaced teeth on its periphery, the stacked links each having a pair of teeth separated by a crotch and each tooth being defined by an outside flank and an inside flank, each link having a leading tooth and a trailing tooth defined by said flanks, a pivot pin received in aligned apertures of the links and guide links forming a joint, the successive teeth of the sprocket engaging the leading and trailing tooth of each link block.

10. A silent timing chain and sprocket combination as set forth in claim 9, wherein both the inside flanks and the outside flanks of the blocks of links transmit power between the chain and sprocket and support the joint radially as the chain wraps the sprocket.

11. A silent timing chain and sprocket combination as set forth in claim 10, wherein a sprocket tooth initially engages a lower portion of an inside flank of a leading tooth and slides up the flank as the chain more fully engages the sprocket.

12. A silent timing chian and sprocket combination as set forth in claim 11, wherein the inside flanks of the link teeth have curved edges defined by radii having centers of curvature located outside the confines of the link.

13. A silent timing chain and sprocket combination as set forth in claim 12, wherein said chain has a pitch line extending through the centers of the link apertures, and said sprocket has a circular pitch line tangential to the tips of the sprocket teeth, said chain pitch line substantially coinciding with the sprocket pitch line as the chain wraps the sprocket.

* * * * *

UNITED STATES PATENT AND TRADEMARK OFFICE
CERTIFICATE OF CORRECTION

PATENT NO. : 4,758,210

DATED : July 19, 1988

INVENTOR(S) : TIMOTHY J. LEDVINA

It is certified that error appears in the above-identified patent and that said Letters Patent is hereby corrected as shown below:

```
Column 3, line 47 cancel "sticked" and
                  insert -- stacked --.
```

Signed and Sealed this

Seventh Day of February, 1989

Attest:

DONALD J. QUIGG

Attesting Officer

Commissioner of Patents and Trademarks